United States Patent
Kabbani et al.

(10) Patent No.: US 9,608,913 B1
(45) Date of Patent: Mar. 28, 2017

(54) WEIGHTED LOAD BALANCING IN A MULTISTAGE NETWORK

(71) Applicant: GOOGLE INC., Mountain View, CA (US)

(72) Inventors: Abdul Kabbani, Los Gatos, CA (US); Jahangir Hasan, Saratoga, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 31 days.

(21) Appl. No.: 14/223,645

(22) Filed: Mar. 24, 2014

Related U.S. Application Data

(60) Provisional application No. 61/943,851, filed on Feb. 24, 2014.

(51) Int. Cl.
*H04L 12/803* (2013.01)
*H04L 12/743* (2013.01)

(52) U.S. Cl.
CPC ........ *H04L 47/125* (2013.01); *H04L 45/7457* (2013.01)

(58) Field of Classification Search
None
See application file for complete search history.

(56) References Cited

U.S. PATENT DOCUMENTS

| | | | |
|---|---|---|---|
| 7,190,696 B1 * | 3/2007 | Manur et al. | 370/392 |
| 7,319,700 B1 * | 1/2008 | Kompella | 370/400 |
| 7,613,209 B1 * | 11/2009 | Nguyen et al. | 370/474 |
| 7,743,200 B1 * | 6/2010 | Panwar et al. | 711/3 |
| 7,898,959 B1 * | 3/2011 | Arad | 370/235 |
| 8,081,632 B2 * | 12/2011 | Davis et al. | 370/392 |
| 8,169,915 B1 * | 5/2012 | Rangavajjhala et al. | 370/237 |
| 8,675,672 B1 * | 3/2014 | Bao et al. | 370/408 |
| 8,977,660 B1 * | 3/2015 | Xin et al. | 707/827 |
| 9,306,851 B1 * | 4/2016 | Gazit | H04L 45/748 |
| 2003/0026268 A1 * | 2/2003 | Navas | 370/400 |
| 2003/0093616 A1 * | 5/2003 | Slavin | 711/108 |
| 2003/0099237 A1 * | 5/2003 | Mitra et al. | 370/393 |
| 2004/0100950 A1 * | 5/2004 | Basu et al. | 370/389 |
| 2005/0141519 A1 * | 6/2005 | Rajgopal et al. | 370/395.32 |

(Continued)

OTHER PUBLICATIONS

Liu, et al, "zUpdate: Updating Data Center Networks with Zero Loss", SIGCOMM'13, Aug. 12-16, 2013, 12 pages.

(Continued)

*Primary Examiner* — Jeffrey M Rutkowski
*Assistant Examiner* — Jonathan B Wood
(74) *Attorney, Agent, or Firm* — McDermott Will & Emery LLP

(57) ABSTRACT

A method for weighted data traffic routing can include generating an integer hash value based on a header of a data packet and encoding the integer hash value to generate a search key for a content addressable memory included in the data switch. The method can also include performing a lookup in the content addressable memory to match the search key with one of a plurality of prefixes stored in the content addressable memory, the plurality of prefixes including an encoded set of routing weights associated with a plurality of egress ports of the data switch. The method can further include forwarding the data packet on an egress port of the plurality of egress ports associated with the one of the plurality of prefixes in the content addressable memory.

18 Claims, 3 Drawing Sheets

(56) References Cited

U.S. PATENT DOCUMENTS

| | | | | |
|---|---|---|---|---|
| 2006/0262583 | A1* | 11/2006 | Venkatachary | 365/49 |
| 2007/0086429 | A1* | 4/2007 | Lawrence et al. | 370/351 |
| 2007/0115982 | A1* | 5/2007 | Pope et al. | 370/392 |
| 2008/0126321 | A1* | 5/2008 | Chong et al. | 707/3 |
| 2008/0189769 | A1* | 8/2008 | Casado et al. | 726/4 |
| 2008/0279096 | A1* | 11/2008 | Sullivan et al. | 370/221 |
| 2009/0201935 | A1* | 8/2009 | Hass et al. | 370/395.32 |
| 2009/0267812 | A1* | 10/2009 | Chen | H03M 7/46 341/67 |
| 2009/0274154 | A1* | 11/2009 | Kopelman et al. | 370/395.32 |
| 2011/0072151 | A1* | 3/2011 | Sharma et al. | 709/233 |
| 2013/0033978 | A1* | 2/2013 | Eckert et al. | 370/216 |
| 2014/0003436 | A1* | 1/2014 | Wang | 370/392 |
| 2014/0122791 | A1* | 5/2014 | Fingerhut et al. | 711/108 |
| 2014/0153571 | A1* | 6/2014 | Neugebauer | H04L 45/7457 370/392 |
| 2014/0355615 | A1* | 12/2014 | Chang | 370/392 |
| 2015/0039823 | A1* | 2/2015 | Chen | 711/108 |
| 2015/0106420 | A1* | 4/2015 | Warfield et al. | 709/201 |

OTHER PUBLICATIONS

Al-Fares, Mohammad, Loukissas, Alexander, Vahdat, Amin. A Scalable, Commodity Data Center Network Architecture, proceedings of SIGCOMM, Aug. 17-22, 2008, 12 pages.

Lakshminarayanan, Karthik, Rangarajan, Anand, Venkatachary, Srinivasan. Algorithms for Advanced Packet Classification with Ternary CAMs, Proceedings of SIGCOMM '05, Aug. 21-26, 2005, 12 pages.

* cited by examiner

WEIGHTED LOAD BALANCING IN A MULTISTAGE NETWORK

CROSS-REFERENCE TO RELATED APPLICATION

This application is a Nonprovisional of, and claims priority to, U.S. Patent Application No. 61/943,851, filed on Feb. 24, 2014, entitled "WEIGHTED LOAD BALANCING IN A MULTISTAGE NETWORK", which is incorporated by reference herein in its entirety.

TECHNICAL FIELD

This description relates to systems and techniques for weighted load balancing in a multistage network.

BACKGROUND

A network may include a multistage network, which may include a wired and/or wireless network. In some example implementations, a multistage network may be used in the context of telecommunication and data centers to realize large-scale networks. A multistage network in a data center may have a large shared infrastructure of shared resources. In the multistage network, there may be multiple paths on which to send traffic between a source device and a destination device using the shared infrastructure. Weighted routing of data traffic over such multiple paths can be used to load balance data traffic in a multistage networks. However, current approaches for weighted may be complicated to implement in large multistage networks, such as, for example, data center networks.

SUMMARY

According to one general aspect, a method includes generating, by a data switch, an integer hash value based on a header of a data packet and encoding the integer hash value to generate a search key for a content addressable memory included in the data switch. The method also includes performing a lookup in the content addressable memory to match the search key with one of a plurality of prefixes stored in the content addressable memory, the plurality of prefixes including an encoded set of routing weights associated with a plurality of egress ports of the data switch. The method further includes forwarding the data packet on an egress port of the plurality of egress ports associated with the one of the plurality of prefixes in the content addressable memory.

Implementations of the above general aspect may include one or more of the following features. For example, the method can include, prior to generating the integer hash value, receiving, at the data switch, the data packet for transmission to a destination address and determining, based on the destination address, a routing table for routing the packet, the routing table being implemented in the content addressable memory. Encoding the integer hash value can include encoding the integer hash value using one of naive range encoding, fence encoding and database independent pre-encoding (DIRPE). The encoded set of routing weights can include a set of encoded integer ranges corresponding with a set of respective routing weights for the plurality of egress ports. The encoded set of routing weights and the search key can be encoded using a same encoding algorithm.

In another general aspect, a data switch includes at least one memory that is configured to store instructions and at least one processor that is operably coupled to the at least one memory. The at least one processor may be configured to process the instructions to cause the data switch to generate an integer hash value based on a header of a data packet and encode the integer hash value to generate a search key for a content addressable memory that is included in the data switch. The instructions also cause the data switch to perform a lookup in the content addressable memory to match the search key with one of a plurality of prefixes stored in the content addressable memory, the plurality of prefixes including an encoded set of routing weights associated with a plurality of egress ports of the data switch and forward the data packet on an egress port of the plurality of egress ports associated with the one of the plurality of prefixes in the content addressable memory.

Implementations of the above general aspect may include one or more of the following features. For example, the instructions may cause the data switch, prior to generating the integer hash value, to receive, at the data switch, the data packet for transmission to a destination address and determine, based on the destination address, a routing table for routing the packet, the routing table being implemented in the content addressable memory.

The encoded set of routing weights can include a set of encoded integer ranges corresponding with a set of respective routing weights for the plurality of egress ports. The encoded set of routing weights and the search key can be encoded using a same encoding algorithm. The content addressable memory can include a ternary content addressable memory.

In another general aspect, a method includes receiving, at a data switch, a set of routing weights for a plurality of egress ports of the data switch and converting the set of routing weights to a set of contiguous integer ranges. The method also includes generating a set of ternary content addressable memory (TCAM) prefixes by encoding the set of contiguous integer ranges and storing the set of TCAM prefixes and their respective egress ports of the plurality of egress ports in a TCAM of the data switch, where the TCAM implements a weighted cost multi-path (WCMP) routing table for the plurality of egress ports.

Implementations of the above general aspect may include one or more of the following features. For example, encoding the set of contiguous integer ranges can include encoding the set of contiguous integer ranges using one of naive range encoding, fence encoding and database independent pre-encoding (DIRPE). Converting the set of routing weights to the set of contiguous integer ranges can include performing summation on the set of routing weights. The set of routing weights can include a set of integer routing weights.

The set of routing weights can be a first set of routing weights, the set of contiguous integer ranges can be a first set of contiguous integer ranges and the set of TCAM prefixes can a first set of TCAM prefixes. The method can include receiving, at the data switch, a second set of routing weights for the plurality of egress ports of the data switch, the second set of routing weights being different than the first set of routing weights and converting the second set of routing weights to a second set of contiguous integer ranges. The method can include generating a second set of TCAM prefixes by encoding the second set of contiguous integer ranges and storing the second set of TCAM prefixes and their respective egress ports of the plurality of egress ports in the TCAM of the data switch.

In another general aspect, a data switch includes at least one memory that is configured to store instructions and at least one processor that is operably coupled to the at least one memory. The at least one processor may be configured to process the instructions to cause the data switch to convert a set of routing weights for a plurality of egress ports of the data switch to a set of contiguous integer ranges and generate a set of ternary content addressable memory (TCAM) prefixes by encoding the set of contiguous integer ranges. The instructions further cause the data switch to store the set of TCAM prefixes and their respective egress ports of the plurality of egress ports in a TCAM of the data switch, the TCAM implementing a weighted cost multi-path (WCMP) routing table for the plurality of egress ports.

Implementations of the above general aspect may include one or more of the following features. For example, the set of contiguous integer ranges includes can be encoded using one of naive range encoding, fence encoding and database independent pre-encoding (DIRPE). The set of routing weights can be converted to the set of contiguous integer ranges by performing summation on the set of routing weights.

The set of routing weights can be a first set of routing weights, the set of contiguous integer ranges can be a first set of contiguous integer ranges and the set of TCAM prefixes can be a first set of TCAM prefixes. The instructions can further cause the data switch to receive, at the data switch, a second set of routing weights for the plurality of egress ports of the data switch, the second set of routing weights being different than the first set of routing weights. The instructions can further cause the data switch to convert the second set of routing weights to a second set of contiguous integer ranges and generate a second set of TCAM prefixes by encoding the second set of contiguous integer ranges. The instructions can further cause the data switch to store the second set of TCAM prefixes and their respective egress ports of the plurality of egress ports in the TCAM of the data switch.

The instructions can further cause the data switch to generate a hash value based on a header of a data packet, encode the hash value to generate a search key for the TCAM, perform a lookup in the TCAM to match the search key with a TCAM prefix of the set of TCAM prefixes stored in the TCAM and forward the data packet on an egress port of the plurality of egress ports associated with the TCAM prefix of the set of TCAM prefixes.

The details of one or more implementations are set forth in the accompanying drawings and the description below. Other features will be apparent from the description and drawings, and from the claims.

DETAILED DESCRIPTION

This document describes systems and techniques for routing packets in a network. For example, a source device may transmit packets to a destination device using a multi-level network, where multiple data paths (links) may be available (used) to transmit data between the source device and the destination device. Data switches (or other data routing devices) in the multi-level network may use a weighted cost multi-path (WCMP) routing table (e.g., included in a WCMP routing module) to balance data traffic (between the source device and the destination device) over the multiple paths between the source device and the destination device. Such load balancing (e.g., WCMP data traffic routing) may be implemented using the techniques described herein.

Figure 1:
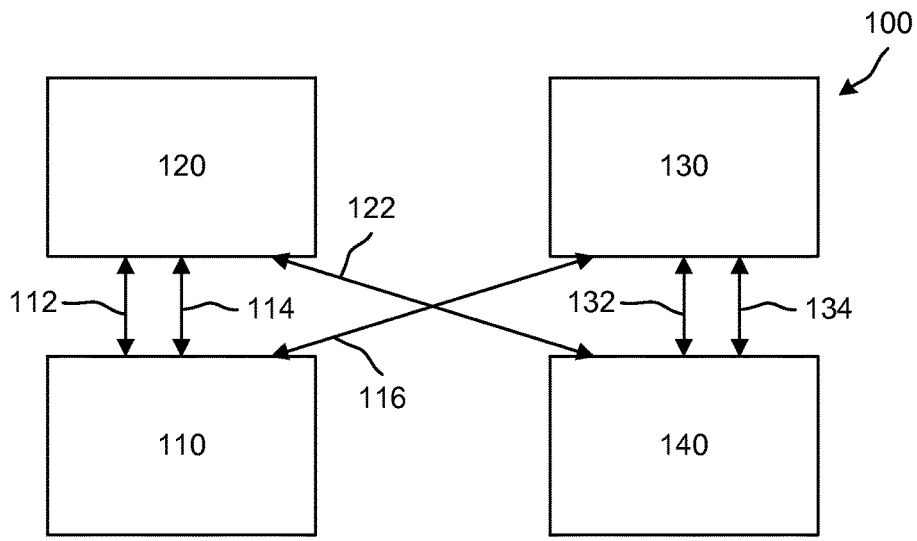
FIG. 1 is a block diagram illustrating a multi-level, multi-path network, in accordance with an embodiment.

FIG. 1 is a block diagram illustrating a multi-level, multi-path network 100, in accordance with an embodiment. The network 100 includes a first data switch 110, a second data switch 120, a third data switch 130 and a fourth data switch 140. The network 100 also includes data communication links 112, 114, 116, 122, 132, 134, which are used to communicate data (e.g., packet data) between the data switches 110, 120, 130, 140. The data switches 110, 120, 130, 140 may include a number of different devices, such as a network data switch, a router, or other device capable of communicating (steering, routing, switching) data (such as packet data) from a source device to a destination device.

The network 100 illustrated in FIG. 1 (which may be referred to as a multistage network) is shown for purposes of illustration. In other embodiments, such multistage networks may include a large number of data communication devices (data switching devices). For example, such multistage networks may be used to implement large-scale commercial networks, such as commercial data center networks (DCNs). Scalability of such networks may be achieved by using relatively inexpensive and power-efficient commodity data switch devices as the building block at each network stage, instead of using fewer relatively expensive, high-end, large and complex switches.

In such multistage networks, data traffic may be routed using equal cost multi-path (ECMP) routing for load-balancing data traffic across the different switches at each stage. When the data switches in a multistage network, such as the data switches in the network 100, have more than one neighbor on which they can forward data traffic toward a given destination (e.g., with all resulting routes preferably being of a same length), ECMP randomly distributes (e.g., using a hash function and a corresponding modulus operation) to route different data traffic flows destined for the given destination across a group of ports connected to those neighbors, with substantially the same probability of each path being selected for a given data flow. For instance, if two communication links connect a first data switch and a second data switch, using ECMP would result, over a sufficient sample size, in fifty percent of data traffic that is communicated between the first switch and the second switch being communicated over one data communication link and the other fifty percent of data traffic being communicated over the other data communication link. Accordingly, such ECMP approaches may provide substantially equally balanced traffic distribution in multistage networks that are of uniform topology (e.g., there is a same number of data links from a given data switch to each neighboring switch along parallel data paths).

However, ECMP approaches would not (e.g., presuming the use of statistically sufficient random selection) provide such evenly balanced traffic distribution in multistage networks that have uneven inter-stage connectivity topologies. For example, in a network with such an uneven inter-stage connection topology, the ports (ingress ports and egress ports, which may also be referred to as communication links, or links) that connect a sending switch with its neighboring switches on parallel paths are not evenly distributed.

As illustrated in FIG. 1, the network 100 includes such an uneven inter-stage topology (connectivity). For instance, in the network 100, the data switch 110 may communicate data traffic to the data switch 140 via the data switch 120, or via the data switch 130. However, there are two links 112, 114 connecting the data switch 110 and the data switch 120, while there is only one link 116 connecting the data switch 110 and the data switch 130.

Such uneven inter-stage connectivity in such a multistage network may occur, for instance, by design. This design choice may occur because of the number of data switches present at each stage (e.g., due to the configuration of the particular network), or may occur because the multistage network was intentionally configured to leverage certain traffic locality patterns with uneven inter-stage connectivity. In other instances, uneven inter-stage connectivity in a multi-stage network may occur as a result of link failures between data switches in the network.

Weighted cost multi-path (WCMP) data routing may be used to overcome, at least some of, the shortcomings of ECMP to evenly balance data traffic in such multi-stage networks with uneven inter-stage topologies. Because ECMP, which inherently assumes that all paths to a certain destination have a same capacity, balancing data traffic across unevenly distributed links with equal probability results in unequal traffic loading.

For example and purposes of illustration, with reference to FIG. 1, consider using ECMP for routing data traffic from the data switch 110 to the data switch 140 (where that traffic can go through either the data switch 120 or the data switch 130). Because ECMP routes data traffic using an equal-probability hashing function (e.g., and a corresponding modulo function), that is equally like to select each of the egress ports (links) 112, 114, 116 of the data switch 110 (which, in this example, are presumed to have equal capacity) for a arbitrary data flow, using ECMP would (over a population of data flows) result in twice as much data traffic being sent to data switch 120 (e.g., over the links 112, 114) as compared to the amount of data traffic sent to the data switch 130, despite the fact that the overall capacities of the two parallel paths from the switch 110 to the switch 140 (i.e., respectively through the switch 120 and the switch 130) are substantially the same (e.g., each of the links 112, 114, 116, 122, 132, 134 have the same capacity).

Accordingly, using ECMP in the network 100 (with its uneven inter-stage topology) leads to (for data traffic from the switch 110 to the switch 140) underutilizing the path through data switch 130 by 50% compared to using WCMP, where the links 112, 114 (from the switch 110 to 120) each have a weight of "1" and the link 116 (from the switch 110 to the switch 130) has a weight of "2", resulting in twice as much data traffic (from the switch 110 to the switch 140) being routed on the link 116 as each of the links 112, 114.

Currently data switching devices (e.g., commodity data switches) support ECMP functionality, but have no direct functional support (hardware, software and/or firmware) for WCMP data traffic routing. Instead, WCMP functionality is accomplished by overloading (replicating entries in) an ECMP table to achieve WCMP traffic routing. Referring still to FIG. 1, and the example discussed above, WCMP traffic routing may accomplished for data traffic from the data switch 110 to the data switch 140 by using an EMCP table with four entries, where each of the links 112, 114 is listed once and the link 116 has a replicated listing (is listed twice), for a total of four entries. Such an approach represents a routing weight of "2" for the link 116 (by virtue of being listed twice) and a routing weight of "1" for each of the links 112, 114 (by virtue of them each being listed once).

While in the above example, WCMP may easily implemented by replicating the egress port listing for the link 116 in an EMCP table, such an approach does not work well for large scale multi-level networks, such as on networks on the order a commercial DCN. Scalability of WCMP in such networks has multiple considerations. For example, one consideration is the ability to support an arbitrary mix of weights with sufficient resolution in the switches of such networks. In large scale networks (e.g., with uneven inter-stage topologies), using ECMP tables with replicated entries to implement WCMP would typically require a prohibitive degree of replication (i.e., the required table sizes would likely far exceed the capacity of memory structures currently used to implement ECMP tables).

Another scalability concern for WCMP in large scale multi-level networks is the complexity of updating routing weights in the switches used to implement those networks. For instance, in such large scale multi-level networks (e.g., DCNs), relatively simple changes in routing weights may become large complex operations. For example, consider changing a routing weight of "5" to a routing weight of "4" in for a group with current weights 5, 30, 75, 40. Because current implementation do not take into account previous table configurations when altering routing weights, such a change would require rewriting, potentially, 149 table entries (e.g., 4+30+75+40). Accordingly, the amount of work can be arbitrarily large for even a small delta in weights.

Figure 2:
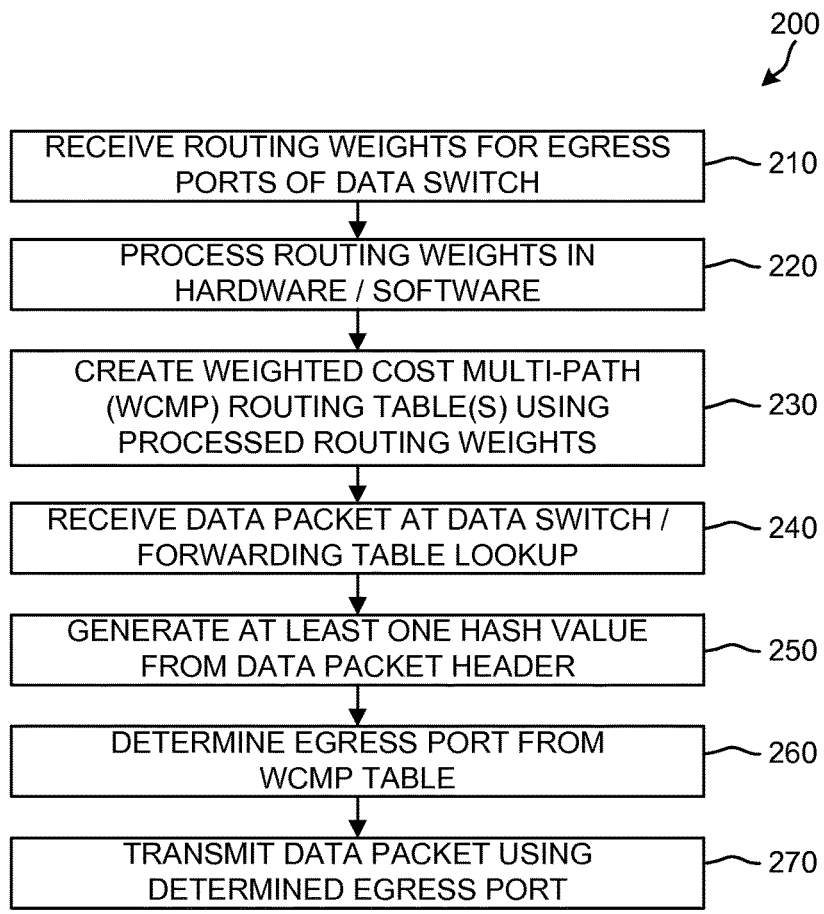
FIG. 2 is a flowchart illustrating a method for routing data traffic in a multi-level, multipath network, according to an example embodiment.

FIG. 2 is a flowchart illustrating a method 200 for WCMP data traffic routing in a multi-level, multipath network, according to an example embodiment. The method 200 is provided by way of illustration and may be implemented using a number of approaches, such as those described herein. In other embodiments, other approaches may be used to implement WCMP data traffic routing.

The method 200, includes, at block 210, receiving a set of routing weights for a group of egress ports of a data switch. For instance, the routing weights received at block 210 may correspond with a group of egress ports that can be used to send data traffic to a particular destination. The routing weights of block 210 may be used to implement WCMP data traffic routing for data traffic sent from the data switch to that particular destination. The routing weights may be provided to the data switch using a number of approaches. For example, the routing weights may be provided to the data switch from a network configuration system. The data switch, at block 210, may receive the routing weights via a management port, via a configuration packet, or by a number of other approaches.

At block 220, the method 200 includes processing (which may also be referred to as pre-processing) the routing weights received at block 210, such as using hardware or software (or firmware) for use in a WCMP table (or WCMP tables). At block 230, the processed (pre-processed) weights of block 220 may be used (further processed) to create one or more WCMP data routing tables, where the WCMP table(s) created at block 230 may be used to route data traffic from the data switch of block 210 to the particular destination with which the received routing weights are associated. The one more WCMP tables of block 230 may be stored in the data switch using hardware, software, or a combination thereof.

At block 240, a data packet may be received at the data switch of block 210. When the data packet is received, the data switch may determine a destination address of the data packet. The destination address may then be looked up in a forwarding table to determine a corresponding routing table (or tables) to use to determine an egress port to use to send the received data packet along to its destination. If the destination address of the data packet received at block 240 corresponds with the destination address associated with the routing weights received at block 210, the forwarding table lookup may return a pointer to the WCMP table (or tables) generated at block 230.

After a determination is made, at block 240, to use the WCMP table (or tables) of block 230 to determine an egress port (hardware port or data transmission link) to use for sending the data packet along to its destination, the method 200 includes, at block 250, generating at least one hash value from a header of the received data packet. In order to ensure that all data packets in a given data flow are sent on a same path, the hash value (or values) may be generated using one or more fields of the data packet header that, for a given data flow, have fixed values. For instance a flow identification field, a source address field, a destination address field, a protocol identification field and/or a number of other possible fields with fixed values for a given data flow. The specific header field (or fields) that are used for generating the one or more hash values may depend on the particular network implementation.

At block 260, the method 200 includes determining, by using the one or more hash values as lookup value(s) for the WCMP tables of block 230. The lookup, at block 260 returns (determines) an egress port of the data switch to use to forward the data packet onto its destination. At block 270, the method 200 includes transmitting the data packet using the determined egress port. In the method 200 (as well as other methods for performing WCMP data traffic routing), a number of different hash functions may be used. For instance, a CRC16 hash function, a CRC32 hash function, an AES hash function, an SHA hash function and/or a number of other hash functions may be used. The hash function(s) used should be selected such that the hash values generated are sufficiently random for data routing purposes in a multi-level network, such as those described herein.

Further, in example embodiment, a modulus (remainder) of the hash value generated by the selected hash functions may be taken before performing a lookup in the WCMP table(s). The result of the modulus function may be used directly, or indirectly, depending on the embodiment, as an index (or lookup value) for the WCMP table(s) of block 230. In such an approach, a modulus function that is applied may be based on the number of entries present in a WCMP table(s) on which the lookup will be performed. For instance, if a 16 bit hash value is generated from a data packet header and an associated WCMP table that will be used to determine an egress port on which to send the data packet has nine entries, the lookup value for the WCMP table may be determined by Equation 1 below:

$$\text{Lookup value} = \text{Hash\_value} \bmod 9 \qquad \text{Equation 1}$$

Which results in a lookup value between 0 and 8, which may be used as a lookup (or to generate a lookup value or search key) for a WCMP table with indices 0 through 8 (with 9 total entries). In certain embodiments, the lookup value may be a function of the result of the modulus operation (e.g., an encoded version of the result of the modulus function). The specific structure and arrangement of the WCMP table(s) (and the associated lookup values) used in the method 200 will depend on the specific embodiment.

Figure 3:
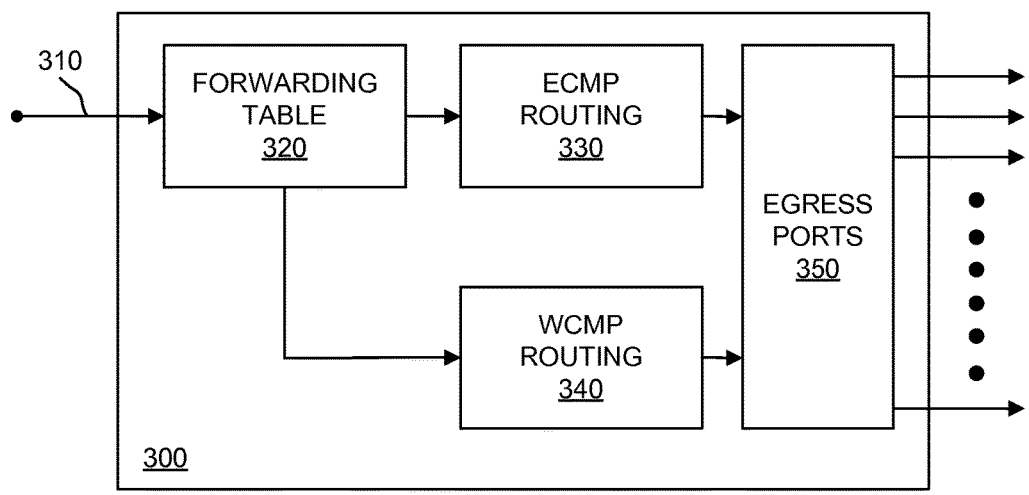
FIG. 3 is a block diagram illustrating elements of a data switch, according to an embodiment.

FIG. 3 is a block diagram illustrating a data switch 300, according to an embodiment. The data switch 300 of FIG. 3 includes an ingress port 310, a forwarding table 320, an ECMP routing module 330, a WCMP routing module 340 and a plurality of egress ports 350. The data switch 300 may also include other elements, such as a switch management port (management port), additional ingress ports, a (network) processor, memory structures, and so forth. The data switch 300 may be used, for example, to implement the techniques for WCMP routing described herein.

For instance, the data switch 300 may receive a set of routing weights for a particular destination, e.g., via the ingress port 310 or a management port (not shown) and use those weights to implement one or more WCMP routing tables that may be included in the WCMP routing module 340. The data switch 300 may also use the ECMP routing module 330 to implement ECMP data traffic routing for one or more destinations in a data network in which the data switch 300 is included, where each parallel path (the multi-paths) between the data switch 300 and a given destination have uniform inter-level topologies.

In the data switch 300, when a data packet is received at the ingress port 310, the data switch 300 may determine a destination address for that data packet from its header. If the destination address of the received data packet corresponds with a destination address that is associated with a WCMP table (or tables) in the WCMP module 340 (e.g., corresponds with the received routing weights), the forwarding table 320 (when the destination address is used to perform a lookup in the forwarding table 320) may return a pointer to the corresponding WCMP routing tables in the WCMP routing module 340. An egress port of the egress ports 350 to use to communicate the data packet to its destination may then be determined from the corresponding WCMP table(s), such as by using the approaches described herein. After the particular egress port to use is determined, the data packet may be sent on to its destination using the determined egress port.

Figure 4:
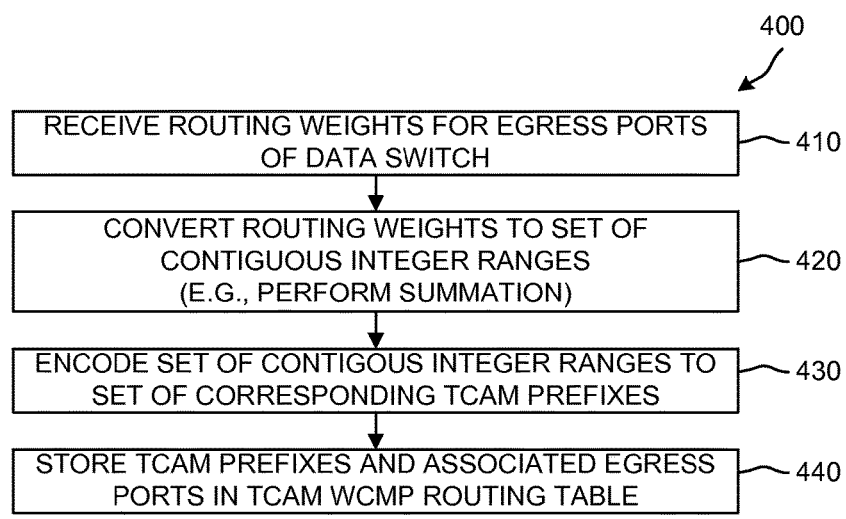
FIG. 4 is a flow chart illustrating a method for implementing weighted cost multi-path (WCMP) routing in a data switch, according to an embodiment.

FIG. 4 is a flow chart illustrating a method 400 for implementing a weighted cost multi-path (WCMP) routing table in a data switching device, according to an embodiment. The method 400, along with other techniques described herein, may be used to implement a relatively simple (as compared to current approaches) and scalable approach for WCMP data traffic routing, as updates can require rewriting far fewer table entries than current approaches.

As shown in FIG. 4, the method 400 includes, at block 410, receiving (e.g., at a data switch) a set of routing weights (WCMP weights) for a plurality of egress ports. As described herein, the routing weights may be a set of routing weights for traffic being sent to a particular destination device. In other embodiments, the routing weights may be for routing data traffic (using WCMP) to multiple destinations, or to a particular group of destinations. Each routing weight of the set of routing weights may be associated, respectively, with a specific egress port of the data switch.

At block 420, the method 400 includes converting (translating) the set of routing weights to a set of contiguous integer ranges on a number line. This conversion of the routing weights to a set of contiguous integer ranges may be referred to as pre-processing the weights, such as discussed above with respect to FIG. 2. The width (numerical width) of each of the integer ranges is respectively proportional to the weight of the particular egress port that a given range corresponds with. For instance, each contiguous integer range may have a lower limit and an upper limit that are determined by using simple summation of the routing weights for a given set of routing weights.

For example, for a set of routing weights of w[0] to w[i], where w[i] equals the routing weight of the ith egress port, the lower limit (LL) of egress port 0 would be LL[0]=0. For i>0, the lower limit would calculated by Equation 2 below:

$$LL[i]=\Sigma_{j=0}^{i-1} w[j] \qquad \text{Equation 2}$$

The upper limit UL[i] for each of the i integer ranges may be determined by Equation 3 below:

$$UL[i]=LL[i]+w[i]-1 \qquad \text{Equation 3}$$

For purposes of illustration, consider a group of three egress ports, port_0, port_1 and port_2, for which WCMP is to be implemented. In this example, the respective routing weights for each of the ports are w[0]=5, w[1]=15 and w[2]=8. Using the formulas above to convert those WCMP weights to a set of contiguous integer ranges results in the following integer ranges for the three egress ports:

port_0=(0-4)
port_2=(5-19)
port_3=(20-27)

The method 400 further includes, at block 430, encoding the set of contiguous integer ranges determined at block 420 into a set of prefixes for a content addressable memory, such as a ternary content addressable memory (TCAM). The encoded prefixes can then be used, at block 440, to create a WCMP routing table by populating a TCAM with the prefixes for each of the contiguous integer ranges and associating, in the TCAM-based WCMP table, the prefixes for each integer range with their corresponding egress port. A number of techniques may be used to generate the encoded prefixes and example approaches for encoding integer ranges to generate TCAM prefixes for use in a WCMP routing table are discussed in further detail below with respect to FIG. 5. If the routing weights for a given ECMP group are modified, the method 400 may be repeated to implement the new set of routing weights.

Figure 5:
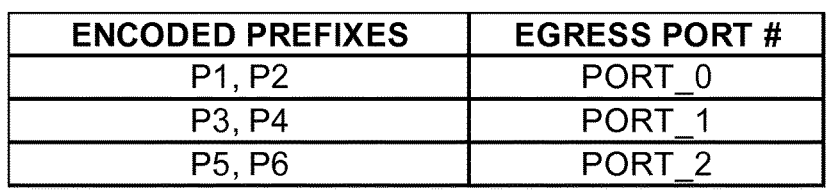
FIG. 5 is a diagram schematically illustrating a WCMP routing table that may be implemented in a ternary content addressable memory (TCAM), according to an embodiment.

FIG. 5 is a diagram schematically illustrating a WCMP routing table 500 that may be implemented in a ternary content addressable memory (TCAM), according to an embodiment. The table 500 may be generated using, for example, the method 400 discussed above. For example, the table 500 associates set of prefixes (TCAM prefixes) with a corresponding egress port, where the group of prefixes associated with a given egress port is determined by encoding an integer range that represents a WCMP weight for that egress port, such as in the approaches described herein.

For example, the encoded prefixes (prefixes) P1, P2 in the table 500 are associated with the egress port_0 in the example discussed above with respect to FIG. 4. Accordingly, the prefixes P1, P2, in this example, would correspond with the integer range of 0-4. Likewise, the prefixes P3, P4 (which are associated with port_1) would correspond with the integer range 5-19, and the prefixes P5, P6 (which are associated port_2) would correspond with the integer range 20-27. While only two prefixes are shown for each entry in the TCAM implement WCMP table 500 shown in FIG. 5, in certain embodiments the number of prefixes may vary (may include fewer or more prefixes). The number of prefixes for a given entry will depend, at least, on the integer range associated with corresponding routing weight and the encoding approach used to generate the TCAM prefixes used in the WCMP table (e.g., such as the table 500). Further, while each row in the table 500 includes multiple prefixes, in an example implementation, each prefix (and its corresponding egress port) may have a unique entry in the table 500 (e.g., may be represented by a dedicated entry in a TCAM).

As noted above, various techniques may be used to encode a set of contiguous integer ranges (representing WCMP routing weights) to produce a set of TCAM prefixes for use in the WCMP table 500, or in other embodiments of a WCMP table. Such techniques may include naive range encoding, fence encoding and/or database independent pre-encoding (DIPRE), as some examples. For purposes of illustration, encoding of the example set of contiguous integer ranges discussed above (to generate TCAM prefixes) using each of the specific types of encoding referenced above is described below.

Naive range encoding may be used to encode the contiguous integer ranges corresponding with a set of WCMP routing weights to generate prefixes for a TCAM implemented WCMP routing table. In such an approach, the integer range is encoded into a set of binary values (prefixes) that represent the range. Where a specific bit for a binary prefix could be either a "1" or a "0", the prefixes are encoded using wild cards ("x") for those bits. Using naive range encoding, the integer ranges for the example WCMP group discussed above with respect to FIG. 4 may be encoded as shown below:

port_0=(0-4)=>{000xx (0-3), 00100 (4)}
port_1=(5-19)=>{00101 (5), 0011x (6-7), 01xxx (8-15), 100xx (16-19)}
port_2=(20-27)=>{101xx (20-23), 110xx (24-27)}

While the specific integer values represented by each encoded prefix are parenthetically indicated in the above list of prefixes, those integer values would not be present in the actual TCAM entries for a WCMP routing table that is implemented using the approaches described herein. Those integer values are shown above for purposes illustration.

In certain situations, using such naive range encoding may require a large number of prefixes. For instance, in some situations, a given integer range may require a number of prefixes that is equal to a number of bits representing a single prefix. While the average expansion of integer ranges to a number of prefixes using naive range encoding is typically about two prefixes per range, the possibility of much larger expansions may require that a large TCAM (e.g., large number of rows) be provisioned to implement a corresponding WCMP routing table. Further, in certain embodiments, changing routing weights that are encoded using naive range encoding may be a time consuming, complex process. For instance, changing a single weight may result in changing a large number of prefixes in a TCAM that is used to implement an associated WCMP routing table.

In other embodiments, fence encoding may be used to encode a set of contiguous integer ranges corresponding with a set of WCMP routing weights. Fence encoding uses $2^W$ bits for each prefix, where the contiguous integer ranges have W bits of resolution. Fence encoding uses wildcard bits ("x") to denote the integer range, and 0s and 1s to mark the integer range boundaries. Accordingly, each integer range may by represented by a single encoded prefix. Referring again to the example WCMP group discussed above, prefixes for the integer ranges for port_0, port_1 and port_2 using fence encoding would be as follows:

port_0=(0-4)=>0000000000000000000000000xxxx (bits 0-4 are wildcards)
port_1=(5-19)=>00000000xxxxxxxxxxxxxx11111 (bits 6-19 are wildcards)
port 2=(20-27)=>xxxxxxx1111111111111111111 (bits 21-27 are wildcards)

As indicated above, fence encoding results in one prefix per integer range that is encoded. However, the width of a TCAM that is used to implement a WCMP routing table that is generated using fence encoding would be based on the desired resolution of the routing weights when implemented in the associated WCMP as fence encoded TCAM prefixes. For example, if an accuracy of 1% in WCMP load distribution is desired, the associated weights may need to have approximately 7 bits of resolution. In such an implementation, a TCAM with a width of 128 bits ($2^7$ bits per prefix) and N rows (where N is the number of egress ports being weight in a given WCMP group) would be used.

Naive range encoding and fence encoding represent two ends of a spectrum. For instance, naive encoding is implemented using "brute force" expansion into multiple prefixes, with the advantage that it can be implemented using narrow TCAMs. In contrast, fence encoding guarantees a single prefix per range, but requires wide TCAM structures (e.g., 128 bits for 7 bits of resolution). If a sufficiently wide TCAM is not available, using fence encoding would be at the sacrifice of resolution (which will, as a result, affect load balancing accuracy across an entire associated WCMP group).

In such situations, where a TCAM has fewer rows, or a narrower width than is desirable for implementing naive range encoding or fence encoding, database independent pre-encoding (DIPRE) may be used to encode TCAM prefixes for a TCAM implemented WCMP table. DIPRE is an encoding technique that is "tuneable" and can be used to achieve a desired middle point between the number of prefixes of naive encoding and the number of bits used for fence encoding.

For instance, DIPRE encoding can be adjusted to be implemented in a TCAM of a given width. Prefix expansion is then used to achieve a desired resolution of weights within the available TCAM width. For instance, DIPRE, when used to encode TCAM prefixes for implementing a WCMP routing table, may include splitting up an available TCAM width into a number of chunks and, likewise, similarly splitting the integer-range values into multiple chunks. Fence encoding may then be used to encode each chunk separately. The fence encoded chunks can then be concatenated to produce a TCAM prefix. Such a split-and-concatenate approach reduces some of the exponential (e.g., $2^W$) TCAM width requirement (of raw fence encoding) by encoding a set of smaller width chunks.

Returning to the previous example for port_0, port_1 and port_2, discussed above, and assuming a TCAM that is only 9 bits wide (which means that it cannot be used for raw fence encoding), TCAM prefixes may be encoded from the previously discussed contiguous integer ranges using DIPRE as follows. First, the 9 bits may be divided into 3 chunks of 3 bits each. Using fence encoding, each chunk can represent 000 to 111 (i.e., 0-3), meaning that each un-encoded chunk is 2-bits. Therefore, prior to encoding each chunk would be 2 bits wide, and the overall width of the un-encoded value would be 6 bits wide.

Accordingly, using DIRPE encoding of each integer range for the WCMP example discussed above would proceed as follows:
For port_0:
  a) port 0=(0-4) in 6 bit binary can be represented as 000000-000100
  b) breaking into 3 chunks of 2-bits each: 00 00 00-00 01 00
  c) now fence encoding to capture this range gives the following prefixes: {000 000 xxx, 000 001 000}
For port_1:
  a) port_1=(5-19) in 6 bit binary can be represented as 000101-010011
  b) breaking into 3 chunks of 2-bits each: 00 01 01-01 00 11
  c) now fence encoding to capture this range gives the following prefixes: {000 001 xx1, 000 x11 xxx, 001 000 xxx}
For port_2:
  a) port_2=(20-27) in 6 bit binary can be represented as 010100-010111
  b) breaking into 3 chunks of 2-bits each: 01 01 00-01 01 11
  c) now fence encoding to capture this range gives the following prefixes: {001 001 xxx}

As shown by the foregoing example, using DIRPE encoding results in six prefixes being generated to represent routing weights for a three port WCMP group. This represents an expansion of two prefixes per port, but allows the use of a much narrower TCAM compared to raw fence encoding (e.g., 9 bits instead of 27 bits). Also, compared to naive range encoding, the expansion is smaller (6 entries/prefixes versus 8 entries/prefixes), and a wider TCAM can be leveraged.

Figure 6:
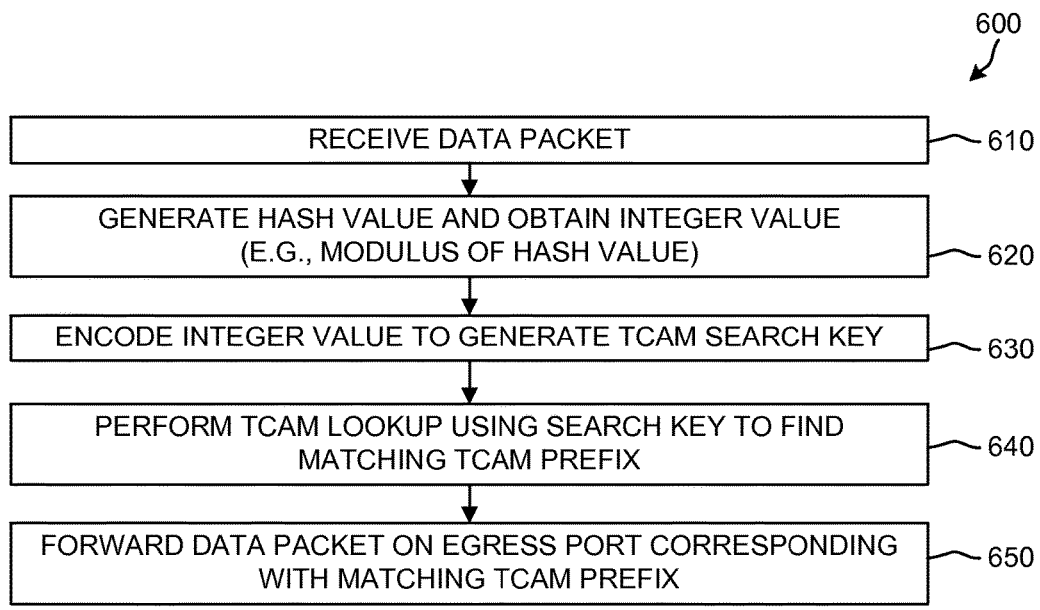
FIG. 6 is a flow chart illustrating a method for WCMP data traffic routing, according to an embodiment.

FIG. 6 is a flow chart illustrating a method 600 for WCMP data traffic routing, according to an embodiment. The method 600 includes, at block 610, receiving a data packet. At block 620, a hash value may be determined from a header of the received data packet, such as using the approaches discussed herein. Additionally, a modulus of the hash value may be determined, where the modulus is an integer value for use as a search key for performing a TCAM lookup in a WCMP table, such as using the approaches described herein. Referring again to the example WCMP group discussed above, the integer value may be determined using Equation 4 below:

$$\text{Integer value} = \text{Hash\_value} \bmod 27 \qquad \text{Equation 4}$$

Equation 4 will produce an integer value in the range of 0-27, where that range corresponds with the overall size of the contiguous integer ranges of the example WCMP group.

At block 630, the integer value determined at block 620 may be encoded using the same encoding technique that was used to encode TCAM prefixes for use in a corresponding WCMP routing table. Referring again to the example discussed above, the following discussion presumes that the hash function (and modulus operation) performed on the header of the incoming packet results in an integer value of 12.

In this situation, if naive range encoding was used to generate the TCAM prefixes of the WCMP table, the integer value of 12 may likewise be encoded as the binary representation of an unsigned-integer (i.e., 12) and, thus, would be encoded as a search key having a binary value of 01100. At block 640, a TCAM lookup may be performed using this search key, which would match the prefix 01xxx (e.g., the second prefix for port_1), which would result in port_1 being the egress port assigned by the WCMP routing table for transmitting the received data packet toward its destination (e.g., at block 650).

For implementations using raw fence encoding, the resulting integer value of 12 may be encoded by setting the 12 least significant bits of the encoded search key to 1 and setting the remaining bits of the encoded search key to 0, resulting in a search key of 00000000111111111111. Using this search key, a TCAM lookup, at block 640, will match the prefix 00000000xxxxxxxxxxxxx11111, representing the integer range 5-19 for port_1, thus selecting port_1.

For implementations using DIPRE, such as in the example discussed above, the integer value of 12 may be represented by a binary value of 001100 (which corresponds to two-bit chunks 00 11 00). DIRPE encoding of the binary value 001100 (using DIPRE encoding as described above) results in a TCAM search key of 000 111 000. When this search key is used, at block 640, to perform a TCAM lookup, the DIPRE encoded search key will match the prefix 000 x11 xxx, the second prefix for port_1. At block 650 (regardless of the type of encoding used), the method 600 includes forwarding the data packet on to its destination using the egress port determined by the TCAM lookup in WCMP routing table implanted therein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer (or device) or on multiple computers (or devices) at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer or device. Generally, a processor will receive instructions and data from a read-only memory or a random access memory or both. Elements of a computer or device may include at least one processor for executing instructions and one or more memory devices for storing instructions and data. Generally, a computer or device also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   generating, by a data switch, an integer hash value based on a header of a data packet;
   encoding the integer hash value to generate a search key for a content addressable memory included in the data switch;
   performing a lookup in the content addressable memory to identify a prefix that matches the search key, wherein the content addressable memory stores a plurality of prefixes, each of the plurality of prefixes is a prefix of an encoded contiguous integer range associated with a routing weight, and each prefix is associated with a respective egress port of a plurality of egress ports of the data switch; and
   forwarding the data packet on an egress port associated with the one of the plurality of prefixes in the content addressable memory identified by the lookup.

2. The method of claim 1, further comprising, prior to generating the integer hash value:
   receiving, at the data switch, the data packet for transmission to a destination address; and
   determining, based on the destination address, a routing table for routing the packet, the routing table being implemented in the content addressable memory.

3. The method of claim 1, wherein the encoding the integer hash value includes encoding the integer hash value using one of naive range encoding, fence encoding and database independent pre-encoding (DIRPE).

4. The method of claim 1, wherein the encoded contiguous integer ranges and the search key are encoded using a same encoding algorithm.

5. A data switch comprising:
at least one memory that is configured to store instructions; and
at least one processor that is operably coupled to the at least one memory and that is configured to process the instructions to cause the data switch to:
generate an integer hash value based on a header of a data packet;
encode the integer hash value to generate a search key for a content addressable memory that is included in the data switch;
perform a lookup in the content addressable memory to identify a prefix that matches the search key, wherein the content addressable memory stores a plurality of prefixes, each of the plurality of prefixes is a prefix of an encoded contiguous integer range associated with a routing weight, and each prefix is associated with a respective egress port of a plurality of egress ports of the data switch; and
forward the data packet on an egress port associated with the one of the plurality of prefixes in the content addressable memory identified by the lookup.

6. The data switch of claim 5, wherein the instructions, when executed by the processor, further cause the data switch, prior to generating the integer hash value, to:
receive, at the data switch, the data packet for transmission to a destination address; and
determine, based on the destination address, a routing table for routing the packet, the routing table being implemented in the content addressable memory.

7. The data switch of claim 5, wherein the encoded contiguous integer ranges and the search key are encoded using a same encoding algorithm.

8. The data switch of claim 5, wherein the content addressable memory includes a ternary content addressable memory.

9. A method comprising:
receiving, at a data switch, a set of routing weights for a plurality of egress ports of the data switch;
converting the set of routing weights to a set of contiguous integer ranges;
generating a set of ternary content addressable memory (TCAM) prefixes by encoding the set of contiguous integer ranges and identifying prefixes of the respective encoded contiguous integer ranges; and
storing the set of TCAM prefixes with corresponding respective egress ports of the plurality of egress ports in a TCAM of the data switch, the TCAM implementing a weighted cost multi-path (WCMP) routing table for the plurality of egress ports; and
forwarding a data packet, received at the data switch, on an egress port of the plurality of egress ports based on a header of the received data packet and the WCMP routing table.

10. The method of claim 9, wherein the encoding the set of contiguous integer ranges includes encoding the set of contiguous integer ranges using one of naive range encoding, fence encoding and database independent pre-encoding (DIRPE).

11. The method of claim 9, wherein the converting the set of routing weights to the set of contiguous integer ranges includes performing summation on the set of routing weights.

12. The method of claim 9, wherein the set of routing weights includes a set of integer routing weights.

13. The method of claim 9, wherein the set of routing weights is a first set of routing weights, the set of contiguous integer ranges is a first set of contiguous integer ranges and the set of TCAM prefixes is a first set of TCAM prefixes, the method further comprising:
receiving, at the data switch, a second set of routing weights for the plurality of egress ports of the data switch, the second set of routing weights being different than the first set of routing weights;
converting the second set of routing weights to a second set of contiguous integer ranges;
generating a second set of TCAM prefixes by encoding the second set of contiguous integer ranges and identifying prefixes of the respective encoded contiguous integer ranges generated based on the second set of contiguous integer ranges; and
storing the second set of TCAM prefixes with corresponding respective egress ports of the plurality of egress ports in the TCAM of the data switch.

14. A data switch comprising:
at least one memory that is configured to store instructions; and
at least one processor that is operably coupled to the at least one memory and that is configured to process the instructions to cause the data switch to:
convert a set of routing weights for a plurality of egress ports of the data switch to a set of contiguous integer ranges;
generate a set of ternary content addressable memory (TCAM) prefixes by encoding the set of contiguous integer ranges and identifying prefixes of the respective encoded contiguous integer ranges; and
store the set of TCAM prefixes with corresponding respective egress ports of the plurality of egress ports in a TCAM of the data switch, the TCAM implementing a weighted cost multi-path (WCMP) routing table for the plurality of egress ports.

15. The data switch of claim 14, wherein the set of contiguous integer ranges are encoded using one of naive range encoding, fence encoding and database independent pre-encoding (DIRPE).

16. The data switch of claim 14, wherein the set of routing weights are converted to the set of contiguous integer ranges by performing summation on the set of routing weights.

17. The data switch of claim 14, wherein the set of routing weights is a first set of routing weights, the set of contiguous integer ranges is a first set of contiguous integer ranges and the set of TCAM prefixes is a first set of TCAM prefixes, the instructions, when executed by the at least one processor, cause the data switch to:
receive, at the data switch, a second set of routing weights for the plurality of egress ports of the data switch, the second set of routing weights being different than the first set of routing weights;
convert the second set of routing weights to a second set of contiguous integer ranges;
generate a second set of TCAM prefixes by encoding the second set of contiguous integer ranges and identifying prefixes of the respective encoded contiguous integer ranges generated based on the second set of contiguous integer ranges; and
store the second set of TCAM prefixes with corresponding respective egress ports of the plurality of egress ports in the TCAM of the data switch.

18. The data switch of claim 14, wherein the instructions, when executed by the at least one processor, further cause the data switch to:
generate a hash value based on a header of a data packet;

encode the hash value to generate a search key for the TCAM;
perform a lookup in the TCAM to match the search key with a TCAM prefix of the set of TCAM prefixes stored in the TCAM; and
forward the data packet on an egress port of the plurality of egress ports associated with the TCAM prefix of the set of TCAM prefixes.

\* \* \* \* \*